United States Patent
Chen

(10) Patent No.: US 10,826,582 B2
(45) Date of Patent: *Nov. 3, 2020

(54) WIRELESS COMMUNICATION DEVICE AND WIRELESS COMMUNICATION METHOD

(71) Applicant: Sony Corporation, Tokyo (JP)

(72) Inventor: Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,180

(22) Filed: Feb. 6, 2020

(65) Prior Publication Data

US 2020/0177247 A1  Jun. 4, 2020

Related U.S. Application Data

(63) Continuation of application No. 16/458,882, filed on Jul. 1, 2019, which is a continuation of application (Continued)

(30) Foreign Application Priority Data

Sep. 12, 2014  (CN) .......................... 2014 1 0465051

(51) Int. Cl.
  *H04M 1/00*   (2006.01)
  *H04B 7/0456*  (2017.01)
  (Continued)

(52) U.S. Cl.
  CPC ............. *H04B 7/0478* (2013.01); *H04B 7/04* (2013.01); *H04B 7/06* (2013.01); *H04B 7/0626* (2013.01)

(58) Field of Classification Search
  CPC ... H04W 88/08; H04W 88/085; H04W 16/24; H04W 16/28; H04W 24/00
  (Continued)

(56) References Cited

U.S. PATENT DOCUMENTS

2013/0028341 A1  1/2013  Ayach et al.
2013/0301454 A1  11/2013  Seol et al.
(Continued)

FOREIGN PATENT DOCUMENTS

CN    103684657 A    1/2013
GB    2492564 A      1/2013

OTHER PUBLICATIONS

Chinese Office Action dated Apr. 1, 2019 in Chinese Application No. 201410465051.1.
(Continued)

*Primary Examiner* — Temica M Beamer
(74) *Attorney, Agent, or Firm* — Xsensus LLP

(57) ABSTRACT

A wireless communication device and a wireless communication method. The wireless communication device participates in wireless communication involving an antenna array, includes: a communication unit, configured to receive a signal including antenna array geometric information about a target communication device from the target communication device of the wireless communication device; and an antenna array geometric information parsing unit, configured to determine an antenna array geometric configuration of the target communication device according to the signal, wherein the antenna array geometric information indicates at least one of a geometric arrangement way of antenna elements in the antenna array, an antenna element interval and an antenna polarization direction.

18 Claims, 10 Drawing Sheets

Related U.S. Application Data

No. 16/136,012, filed on Sep. 19, 2018, now Pat. No. 10,348,376, which is a continuation of application No. 15/328,663, filed as application No. PCT/CN2015/088000 on Aug. 25, 2015, now Pat. No. 10,116,365.

(51) Int. Cl.
*H04B 7/04* (2017.01)
*H04B 7/06* (2006.01)

(58) Field of Classification Search
USPC .................. 455/67.11, 67.13, 561, 562.1
See application file for complete search history.

(56) References Cited

U.S. PATENT DOCUMENTS

| | | |
|---|---|---|
| 2013/0321207 A1 | 12/2013 | Monogioudis et al. |
| 2014/0016549 A1 | 1/2014 | Novlan et al. |
| 2016/0269093 A1 | 9/2016 | Seol et al. |

OTHER PUBLICATIONS

Chinese Office Action dated Feb. 6, 2020 in Chinese Application No. 201410465051.1.

(a)   (b)   (c)   (d)

WIRELESS COMMUNICATION DEVICE AND WIRELESS COMMUNICATION METHOD

CROSS-REFERENCE TO RELATED APPLICATIONS

The present application is a continuation of U.S. application Ser. No. 16/458,882, filed Jul. 1, 2019, which is a continuation of U.S. application Ser. No. 16/136,012, filed Sep. 19, 2018 (now U.S. Pat. No. 10,348,376), which is a continuation of U.S. application Ser. No. 15/328,663, filed Jan. 24, 2017 (now U.S. Pat. No. 10,116,365), which is based on PCT filing PCT/CN2015/088000, filed Aug. 25, 2015, which claims priority to CN 201410465051.1, filed Sep. 12, 2014, the entire contents of each are incorporated herein by reference.

TECHNICAL FIELD

The disclosure generally relates to the field of wireless communication, and in particular to a wireless communication apparatus and a wireless communication method which participate in wireless communication using an antenna array.

BACKGROUND

A multi-antenna system, as a technology meeting the requirements of high speed, large capacity and reliable transmission for a mobile communication system, has been studied extensively in recent years. Studies have shown that, the multi-antenna system is able to provide a higher capacity as compared with a conventional single-antenna system, and the capacity of the multi-antenna system increases linearly with the increase of the number of antennas under certain conditions.

An antenna array is a multi-antenna system consisting of a plurality of identical antenna units arranged with certain regularity. The antenna array can be classified into a liner array, a planar array and the like according to the arrangement of antenna units. A common liner array is a rectilinear array where centers of antenna units are arranged equally spaced in a straight line. However, antenna units of the liner array may also be arranged unequally spaced, or centers of antenna units may not be arranged in a straight line, for example, centers of antenna units may be arranged in a circle. Multiple rectilinear arrays arranged on a certain plane at certain interval constitute a planar array. Multiple antenna units arranged with their centers on a spherical surface constitute a spherical array.

In a multi-antenna system, if a transmitting side can be informed of forward channel information in a certain manner, the transmitting side is able to optimize transmission signal according to forward channel characteristics, thereby improving the reception quality and reducing complexity of a receiving side. In an actual frequency division duplex (FDD) system, the forward channel information is conventionally fed back by quantizing the channel information in order to reduce feedback overhead and improve system transmission efficiency.

In an LTE (Long Term Evolved) frequency division duplex (FDD) system, a codebook-based implicit CSI (Channel State Information) feedback method is adopted. An UE (User Equipment, i.e., a terminal apparatus) measures downlink channel based on a pilot signal, and reports to a base station the number of data layers RI (Rank Indication) that can be supported by the downward channel and Precoding Matrix Indicator (PMI) information according to receiving and processing algorithm of its own. Further, the UE also needs to report Channel Quality Indicator (CQI) for each codeword.

The precoding related to PMI is a self-adaptive technology in the multi-antenna system. In this technology, a precoding matrix is adaptively changed by the transmitting side according to CSI, thereby changing the channel experienced by signals. A set of codebooks including several precoding matrices are stored in both the transmitting side and the receiving side, thus the receiving side may select one of the precoding matrices according to the estimated channel matrix and a certain criterion, and feedback an index value of the selected precoding matrix and the quantized channel status information to the transmitting side. At the next time, the transmitting side adopts a new precoding matrix and determines an encoding and modulation scheme for a codeword according to the quantized channel status information fed back.

SUMMARY OF INVENTION

According to an aspect of the disclosure, it is provided a wireless communication apparatus which participates in wireless communication involving an antenna array, comprising: a communication unit configured to receive, from a target communication apparatus for the wireless communication apparatus, a signal including antenna array geometry information of the target communication apparatus; and an antenna array geometry information parsing unit configured to determine geometry configuration of the antenna array of the target communication apparatus based on the signal, wherein the antenna array geometry information indicates at least one of geometry arrangement of antenna elements in the antenna array, spacing between the antenna elements, and antenna polarization direction.

According to an aspect of the disclosure, it is provided a wireless communication apparatus which is provided with an antenna array, comprising: an antenna array geometry information generation unit configured to generate antenna array geometry information based on geometry configuration of the antenna array of the wireless communication apparatus, where the antenna array geometry information indicates at least one of geometry arrangement of antenna elements in the antenna array, spacing between the antenna elements and antenna polarization direction; and a communication unit configured to transmit a signal including the antenna array geometry information to a target communication apparatus for the wireless communication apparatus.

According to an aspect of the disclosure, it is provided a wireless communication method applied in wireless communication involving an antenna array, comprising: receiving, from a target communication apparatus, a signal including antenna array geometry information of the target communication apparatus; and determining geometry configuration of the antenna array of the target communication apparatus based on the signal, wherein the antenna array geometry information indicates at least one of geometry arrangement of antenna elements in the antenna array, spacing between the antenna elements and antenna polarizing direction.

According to an aspect of the disclosure, it is provided a wireless communication method employed in a wireless communication apparatus provided with an antenna array, comprising: generating antenna array geometry information based on geometry configuration of the antenna array of the wireless communication apparatus, wherein the antenna array geometry information indicates at least one of geometry arrangement of antenna elements in the antenna array, spacing between the antenna elements and antenna polarizing direction; and transmitting a signal including the antenna array geometry information to a target communication apparatus for the wireless communication apparatus.

It is possible to make full use of the antenna array geometry information by communicating the antenna array geometry information regarding the provided antenna array between two parties of communication.

BRIEF DESCRIPTION OF THE DRAWINGS

The above and other objectives, features and advantages will be understood more easily with reference to the following description of embodiments of the present disclosure in conjunction with the drawings. In the drawings, same or corresponding reference numerals indicate same or corresponding technical features or parts. In the drawings, sizes and relative positions of units may not be drawn to scale.

DETAILED DESCRIPTION OF THE EMBODIMENTS

Figure 1:
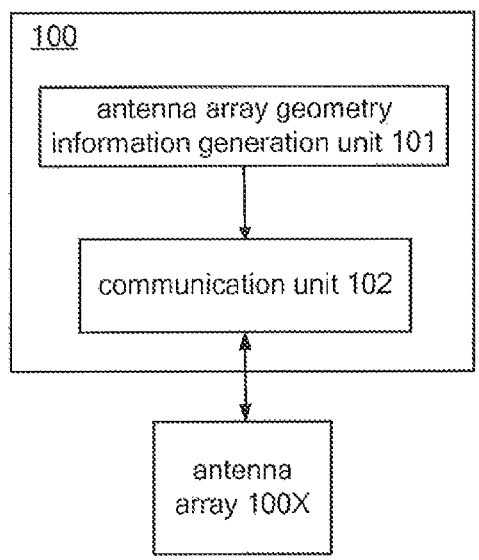
FIG. 1 is a block diagram illustrating a structure of a wireless communication apparatus according to an embodiment of the present disclosure.

In the following, embodiments of the present disclosure are described in conjunction with the drawings. It should be noted that, for clarity, representations and descriptions of parts and processes, which are independent of the present disclosure and known by those skilled in the art, are omitted in the drawings and the description.

In a conventional multi-antenna system, antenna array geometry information is not fully used. In the present disclosure, the antenna array geometry information includes, but is not limited to, geometry arrangement of antenna elements in the antenna array, spacing between the antenna elements in the antenna array, and antenna polarization direction of the antenna elements in the antenna array. In the conventional technology, a base station provided with an antenna array provides only information on the number of antennas in the antenna array to an user equipment (UE). However, the antenna array geometry information is not provided. With application of a large-scale antenna array and introduction of a multi-antenna MIMO (Multi-Input Multi-Output) system, how to use the antenna array geometry information fully and efficiently becomes critical for improving channel efficiency.

Figure 2:
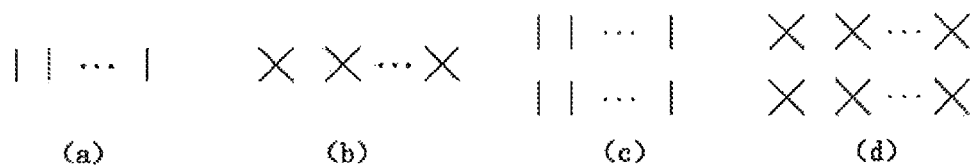
FIG. 2 is a schematic diagram illustrating an antenna array configuration adopted by an antenna array according to an embodiment of the present disclosure.

FIG. 1 is a block diagram illustrating a structure of a wireless communication apparatus 100 according to an embodiment of the present disclosure. The wireless communication apparatus 100 is provided with an antenna array 100X. The wireless communication apparatus 100 may be implemented as a base station, a UE or other network apparatuses such as a relay device according to requirements of a specific communication counterpart apparatus for the antenna array configuration information. The antenna array 100X may be arranged in any configuration as required. For example, FIG. 2 illustrates a non-limiting example of an antenna array configuration that may be adopted by the antenna array 100X.

In the following, for ease of description, it is assumed that the antenna array 100X includes M antenna elements, where M is an integer multiple of 4. As shown in FIG. 2(a), a first antenna array is a uniform liner array consisting of M identically polarized antenna elements. A spacing between the antenna elements in the first antenna array is 0.5 wavelength ($0.5\lambda$) and a total length of the antenna array is $$\frac{M-1}{2}\lambda.$$

A second antenna array as shown in FIG. 2(b) consists of M/2 orthogonal antenna clusters identically disposed and linearly arranged, where one orthogonal antenna cluster consists of two antenna elements of which polarization directions are orthogonal to each other and positions overlap each other, a spacing between orthogonal antenna clusters is 0.5 wavelength. Therefore, a total length of the antenna array is $$\left(\frac{M}{4}-\frac{1}{2}\right)\lambda.$$

A third antenna array as shown in FIG. 2(c) is a uniform planar array consisting of M/2×2 identically polarized antenna elements. A spacing between the antenna elements in the third antenna array is 0.5 wavelength ($0.5\lambda$) and a length and a width of the antenna array are $$\left(\frac{M}{4}-\frac{1}{2}\right)\lambda \text{ and } \frac{\lambda}{2}$$

respectively. A fourth antenna array as shown in FIG. 2(d) consists of M/4×2 orthogonal antenna clusters identically disposed and arranged in a rectangular array, where a spacing between orthogonal antenna clusters is 0.5 wavelength, and a length and a width of the antenna array are $$\left(\frac{M}{8} - \frac{1}{2}\right)\lambda \text{ and } \frac{\lambda}{2}$$

respectively. The possible configurations of the antenna array 100X described above in conjunction with FIG. 2 are only examples and not an exhaustive list of all possible configurations. In practice, one or more of the number of antenna elements in the antenna array, the geometry arrangement of the antenna elements in the antenna array, the spacing between antenna elements in the antenna array and a polarization direction of the antenna in the antenna array can be configured as required. However, it is to be noted that, for the antenna array 100X, generally, the configuration of the antenna array is relatively fixed once the arrangement of the antenna array is completed.

Referring back to FIG. 1, the wireless communication apparatus 100 includes an antenna array geometry information generation unit 101 and a communication unit 102. The antenna array geometry information generation unit 101 is configured to generate antenna array geometry information based on a geometry configuration of the antenna array 100X. Here, the antenna array geometry information indicates at least one of a geometry arrangement of antenna elements in the antenna array 100X (for example but not limited to a liner array or a planar array), the spacing between the antenna elements in the antenna array 100X (for example but not limited to 0.5λ) and antenna polarization direction of the antenna elements in the antenna array 100X (for example but not limited to parallel or orthogonal). In a case that one of the above items is predetermined or not necessary for subsequent processing in a certain communication system, the indication for the item may be omitted in the geometry information. For example, in a case that antenna polarization directions of all of the antenna arrays in the communication system are identical by default, the geometry information may not include the antenna polarization direction information, or in a case that it is not necessary to consider the spacing between antenna elements in subsequent processing, the geometry information may not include contents for indicating the spacing between antenna elements.

The antenna array geometry information generation unit 101 may acquire the geometry information of the antenna array 100X corresponding to the wireless communication apparatus 100 by acquiring a retrieval number of a predefined antenna array database. Alternatively, the antenna array geometry information generation unit 101 may acquire the geometry information of the antenna array 100X corresponding to the wireless communication apparatus 100 through pre-configuration. In a case that the wireless communication apparatus 100 is implemented as a base station, its antenna array geometry information generation unit 101 may acquire the geometry information of the antenna array 100X from a core network via an s1 interface.

The communication unit 102 is configured to transmit a signal including the geometry information of the antenna array 100X to a target communication apparatus for the wireless communication apparatus 100, in order to notify the geometry information of the antenna array provided therewith to the communication counterpart (the target communication apparatus). As an example, in a LTE (including LTE-A) communication system, in a case that the wireless communication apparatus 100 is implemented as a base station, the wireless communication apparatus 100 may include the geometry information of the antenna array 100X into, for example, a system information block and transmit the system information block to a UE or another base station via a broadcast control channel (BCCH), or transmit the geometry information of the antenna array 100X to other base stations via an X2 interface. As an example, in a case that wireless communication apparatus 100 is implemented as a UE, the wireless communication apparatus 100 may transmit the geometry information of its antenna array to a base station through a random access procedure. It should be understood by those skilled in the art that, the technical solution for exchanging the antenna array geometry information between communication apparatus (for example, between the base station and the user equipment, or between the base station and another network apparatus such as a relay apparatus) according to the present disclosure is applicable to other communication systems adopting the multi-antenna technology besides the LTE communication system. For example, those skilled in the art may apply the above technical solution to the developing fifth-generation communication system or a more future communication system based on the design concept of the present disclosure.

Figure 3:
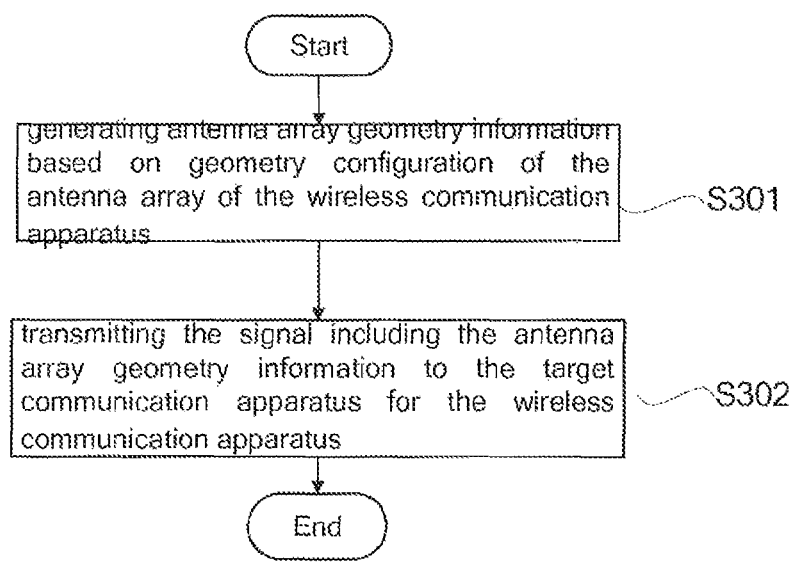
FIG. 3 is a flow chart illustrating a wireless communication method according to an embodiment of the present disclosure.

FIG. 3 is a flow chart illustrating a wireless communication method applied in the wireless communication apparatus 100 according to an embodiment of the present disclosure. In step S301, antenna array geometry information is generated based on a geometry configuration of the antenna array 100X of the wireless communication apparatus 100. According to system requirements, the antenna array geometry information indicates at least one of a geometry arrangement of antenna elements in the antenna array 100X, the spacing between the antenna elements in the antenna array 100X and the antenna polarization direction of the antenna elements in the antenna array 100X. In step S302, a signal including the antenna array geometry information is transmitted to a target communication apparatus for the wireless communication apparatus 100. The specific generating and transmitting manners have been described in conjunction with FIG. 1, and are not described repeatedly here.

Figure 4:
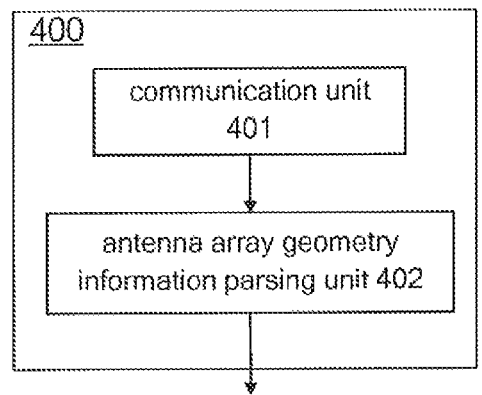
FIG. 4 a block diagram illustrating a structure of a wireless communication apparatus according to an embodiment of the present disclosure.

FIG. 4 is a block diagram illustrating a structure of a wireless communication apparatus 400 according to an embodiment of the present disclosure. The wireless communication apparatus 400 may be considered as an example of a target communication apparatus for the above described wireless communication apparatus 100. The wireless communication apparatus 400 may be a single-antenna communication apparatus, or may be a communication apparatus provided with an antenna array. Based on requirements for antenna array configuration information of a specific communication counterpart apparatus, the wireless communication apparatus 400 may be implemented as a base station, a UE or another network apparatus. The wireless communication apparatus 400 includes a communication unit 401 and an antenna array geometry information parsing unit 402.

The communication unit 401 is configured to receive, from a target communication apparatus (for example, the wireless communication apparatus 100) for the wireless communication apparatus 400, a signal including antenna array geometry information of the target communication apparatus. As described above, the antenna array geometry information indicates at least one of a geometry arrangement of antenna elements in the antenna array, the spacing between the antenna elements in the antenna array, and the antenna polarization direction of the antenna elements in the antenna array of the target communication apparatus. In a case that one of the above items is predetermined or not necessary for subsequent processing in a certain communication system, the indication for the item may be omitted in the geometry information. For example, in a case that antenna polarization directions of all of the antenna arrays in the communication system are identical by default, the geometry information may not include the antenna polarization direction information, or in a case that it is not necessary to consider the spacing between antenna elements in subsequent processing, the geometry information may not include contents for indicating the spacing between antenna elements.

For example, but not as a limitation, in a case that the wireless communication apparatus 400 is implemented as a UE, the wireless communication apparatus 400 can receive the antenna array geometry information included, for example, in a system information block (SIB) transmitted from the base station via a broadcast control channel (BCCH). For example, but not as a limitation, in a case that the wireless communication apparatus 100 is implemented as a base station, the wireless communication apparatus 100 may receive, from a UE, the antenna array geometry information of the antenna array with which the UE is provided through a random access procedure. Alternatively, the wireless communication apparatus 100 can receive, form another UE, the antenna array geometry information of the antenna array with which the other UE is provided via a broadcast control channel (BCCH) or an X2 interface. Alternatively, the wireless communication apparatus 100 can receive, from a core network, the antenna array geometry information of the antenna array of the target communication apparatus for the wireless communication apparatus 100 via an S1 interface.

Further, in a case that the wireless communication apparatus 400 is also provided with an antenna array, the communication unit 401 may be further configured to transmit the antenna array configuration information of the antenna array of the wireless communication apparatus 400 to the target communication apparatus for the wireless communication apparatus 400. The above antenna array configuration information may include, for example, the antenna array geometry information and/or the number of antenna elements.

The antenna array geometry information parsing unit 402 is configured to determine a geometry configuration of the antenna array of the target communication apparatus based on the signal including the antenna array geometry information. The above signal may indicate the geometry configuration of the antenna array in various manners. For example, the above signal may actually include the geometry configuration of the antenna array. Alternatively, the above signal may indicate the geometry configuration of the antenna array by including an index indicating pre-stored geometry configuration information of the antenna array which can be accessed by the wireless communication apparatus 400. Alternatively, the above signal may indicate the geometry configuration by using a combination of the above two manners.

Figure 5:
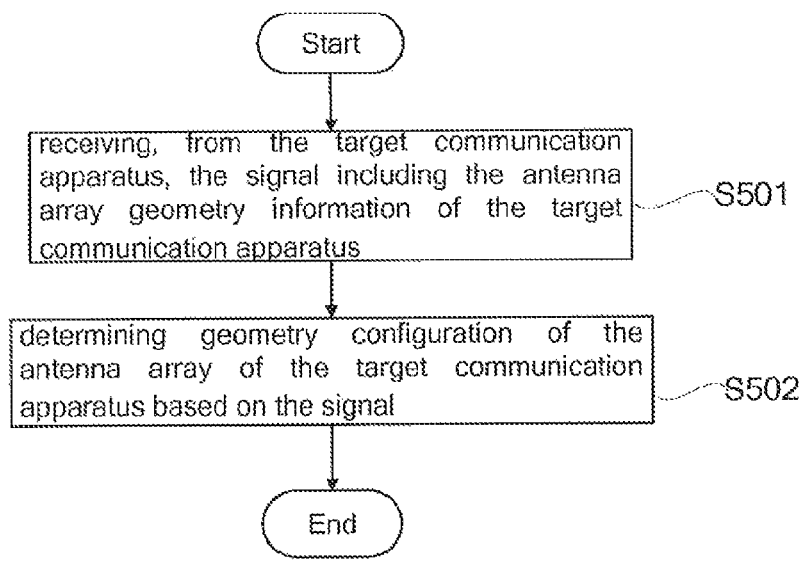
FIG. 5 is a flow chart illustrating a wireless communication method according to an embodiment of the present disclosure.

FIG. 5 is a flow chart illustrating a wireless communication method applied in the wireless communication apparatus 400 according to an embodiment of the present disclosure. In step S501, a signal is received from a target communication apparatus (for example, the wireless communication apparatus 100), where the signal includes geometry information of the antenna array (for example, the antenna array 100X) of the target communication apparatus. According to system requirements, the antenna array geometry information indicates at least one of a geometry arrangement of antenna elements in the antenna array, the spacing between the antenna elements in the antenna array and the antenna polarizing direction of the antenna elements in the antenna array. In step S502, a geometry configuration of the antenna array of the target communication apparatus is parsed based on the signal. The specific receiving and parsing manners have been described in conjunction with FIG. 4, and are not described repeatedly here.

Figure 6:
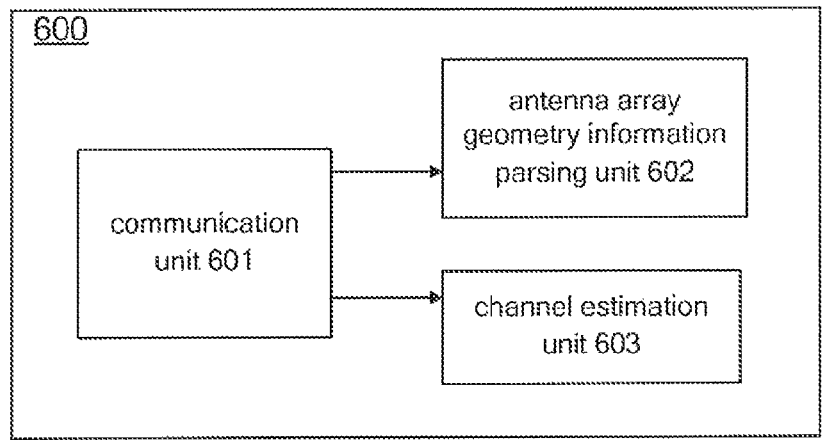
FIG. 6 is a block diagram illustrating a structure of a wireless communication apparatus according to an embodiment of the present disclosure.

In the following, a structure of a wireless communication apparatus 600, which is a further embodiment of the wireless communication apparatus 400, is described in conjunction with FIG. 6. FIG. 6 is a block diagram illustrating a structure of the wireless communication apparatus 600 according to an embodiment of the present disclosure. The wireless communication apparatus 600 includes a communication unit 601, an antenna array geometry information parsing unit 602 and a channel estimation unit 603, where the function and structure of the antenna array geometry information parsing unit 602 are the same as those of the antenna array geometry information parsing unit 402, and are not described repeatedly in the following.

In addition to receiving, from a target communication apparatus for the wireless communication apparatus 600, a signal including antenna array geometry information of the target communication apparatus, the communication unit is configured to receive a training sequence signal from the target communication apparatus. The training sequence signal can reflect channel characteristic of the channel from the target communication apparatus to the wireless communication apparatus. The channel characteristic may be, for example but not as a limitation, channel status and channel quality. As an example, in a case that the wireless communication apparatus 600 is implemented as a UE, the training sequence signal may be a downlink reference signal such as CRS (Common Reference Signal) or CSI-RS (Channel Status Information Reference Signal), for example. As an example, in a case that the wireless communication apparatus 600 is implemented as a base station, the training sequence signal may be an uplink reference signal such as SRS (Sounding Reference Signal), DM-RS (Demodulation Reference Signal) or the like, for example. The communication unit 601 inputs the received training sequence signal into the channel estimation unit 603.

The channel estimation unit 603 may be configured to estimate channel characteristic of the channel from the target communication apparatus to the wireless communication apparatus 600 based on the inputted training sequence signal. Here, the channel estimation unit 603 may estimate the required channel characteristic based on the corresponding training sequence signal with any method known in the art. For example, the channel status (channel quality) of the downlink channel may be estimated according to a CSI-RS signal (Channel Status Information Reference Signal) as required. Here, it is to be noted that, the channel characteristic of the channel from the target communication apparatus to the wireless communication apparatus 600, which is estimated by the channel estimation unit 603, may be an instantaneous channel characteristic, a channel statistical characteristic, or both the instantaneous channel characteristic and the channel statistical characteristic.

Figure 7:
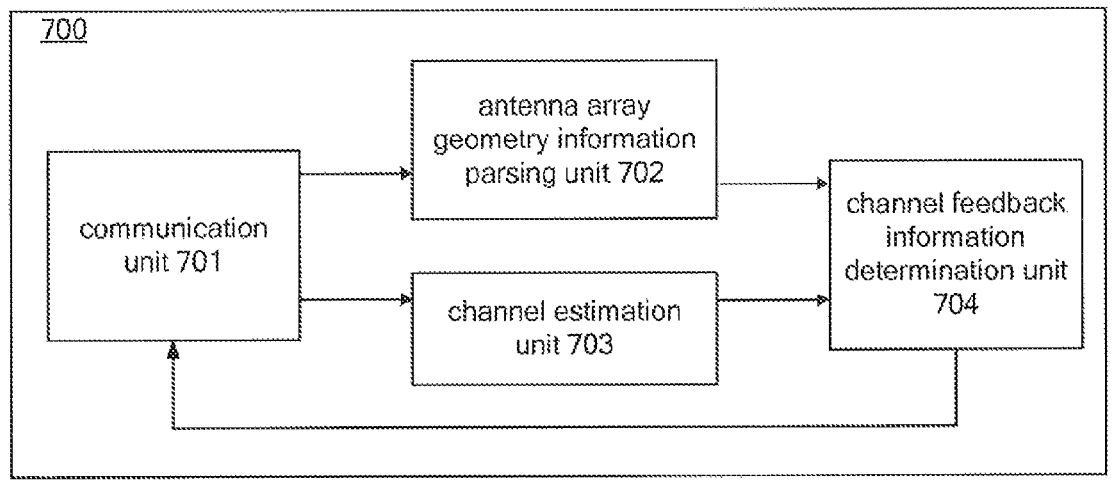
FIG. 7 is a block diagram illustrating a structure of a wireless communication apparatus according to an embodiment of the present disclosure.

In the following, a structure of a wireless communication apparatus 700, which is a further embodiment of the wireless communication apparatus 600, is described in conjunction with FIG. 7. FIG. 7 is a block diagram illustrating a structure of the wireless communication apparatus 700 according to an embodiment of the present disclosure. The wireless communication apparatus 700 includes a communication unit 701, an antenna array geometry information parsing unit 702, a channel estimation unit 703 and a channel feedback information determination unit 704, where functions and structures of the communication unit 701, the antenna array geometry information parsing unit 702 and the channel estimation unit 703 are the same as those of the communication unit 601, the antenna array geometry information parsing unit 602 and the channel estimation unit 603 which are described in conjunction with FIG. 6, and are not described repeatedly in the following.

The channel feedback information determination unit 704 may be configured to determine, based on the geometry configuration of the antenna array acquired by the antenna array geometry information parsing unit 702 and the channel estimation result acquired by the channel estimation unit 703, channel feedback information for indicating the channel characteristic of the channel from the target communication apparatus to the wireless communication apparatus 700. Then, the channel feedback information determination unit 704 may provide the determined channel feedback information to the communication unit 701, such that the communication unit 701 transmits the determined channel feedback information to the target communication apparatus, thereby notifying the target communication apparatus of the channel characteristic. In the following, the following processing is described by way of example: the channel feedback information determination unit 704 determines the channel feedback information indicative of the channel characteristic based on the geometry configuration of the antenna array and the channel estimation result.

In the channel feedback scheme of a conventional multi-antenna system, one codebook is shared among multiple antenna array configurations. The shared codebook includes codewords for different antenna array configurations. For a certain antenna array configuration, codewords in the shared codebook for other antenna array configurations may be considered to be invalid. Therefore, the shared codebook is an inefficient codebook for the certain antenna array configuration since the shared codebook may produce unnecessary channel feedback overhead.

In view of this problem, according to an embodiment of the present disclosure, different codebooks may be provided for antenna arrays with different antenna array geometry configurations. Specifically, different codebooks may be prepared according to one or more of the geometry arrangement of antenna elements in the antenna array, the spacing between the antenna elements in the antenna array, and the antenna polarization direction of the antenna elements in the antenna array. For a certain antenna array configuration, a corresponding codebook does not include codewords for other antenna array configurations, thus unnecessary channel feedback overhead can be reduced.

When implemented in this embodiment, the channel feedback information determination unit 704 may determine a feedback codebook corresponding to the geometry configuration of the antenna array based on the geometry configuration of the antenna array. The channel feedback information determination unit 704 may determine the feedback codebook according to a predetermined rule or in a predetermined manner as required. For example, the wireless communication apparatus 700 may further include a codebook storage unit (not shown). The codebook storage unit may be configured to store multiple feedback codebooks corresponding to multiple geometry configurations of the antenna array. In this case, the channel feedback information determination unit 704 may determine the feedback codebook corresponding to the geometry configuration of the antenna array by querying the codebook storage unit.

Further, the channel feedback information determination unit 704 may determine a codeword in the feedback codebook which matches the channel estimation result made by the channel estimation unit 703. Then the channel feedback information determination unit 704 may include an index number of the determined codeword in the channel feedback information so that the communication unit 701 may feedback the index number of the codeword to the target communication apparatus.

In an embodiment, for example, the feedback codebook may include a precoding matrix codebook.

It is to be noted in this embodiment that, the channel characteristic of the channel from the target communication apparatus to the wireless communication apparatus 700 which is estimated by the channel estimation unit 703 may include at least one of an instantaneous channel characteristic and a channel statistical characteristic. Therefore, according to a type of the adopted channel characteristic, the channel feedback information determination unit 704 may determine the channel feedback information corresponding to the instantaneous channel characteristic and/or the channel feedback information corresponding to the channel statistical characteristic based on the geometry configuration of the antenna array. For example, in a two-stage feedback scheme of the LTE-A system, the instantaneous channel characteristic and the channel statistical characteristic are fed back in a form of precoding matrix indicator (PMI). For the former, the feedback information is determined from a short-term codebook corresponding to the antenna configuration, and for the latter, the feedback information is determined from a long-term codebook corresponding to the antenna configuration.

Figure 8:
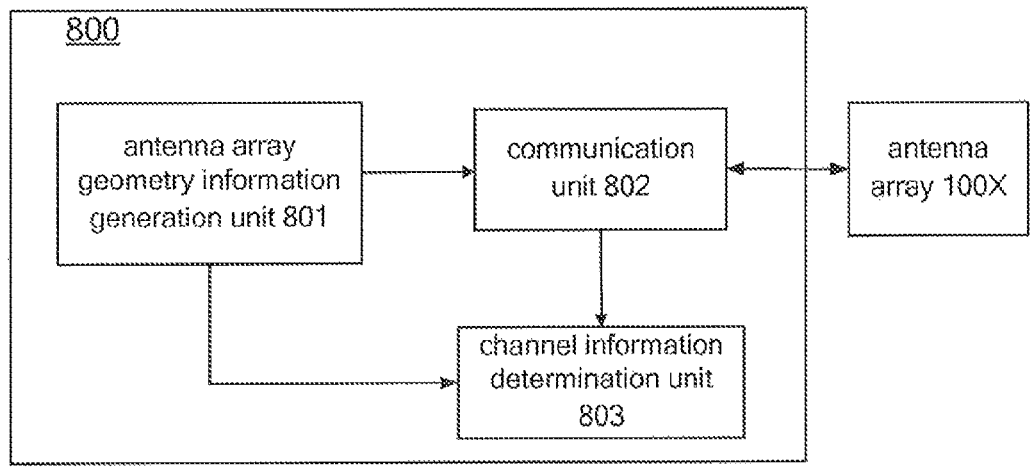
FIG. 8 is a block diagram illustrating a structure of a wireless communication apparatus according to an embodiment of the present disclosure.

Correspondingly, FIG. 8 is a block diagram illustrating a structure of a wireless communication apparatus 800, which is the target communication apparatus for the wireless communication apparatus 700, according to an embodiment of the present disclosure. The wireless communication apparatus 800, which is a further embodiment of the wireless communication apparatus 100, is provided with an antenna array 800X. The wireless communication apparatus 800 includes an antenna array geometry information generation unit 801, a communication unit 802 and a channel information determination unit 803. The function and structure of the antenna array geometry information generation unit 801 are the same as those of the antenna array geometry information generation unit 101, and are not described repeatedly in the following.

In addition to transmitting the signal including the antenna array geometry information of the wireless communication apparatus 800 to a target communication apparatus (for example, the wireless communication apparatus 700) for the wireless communication apparatus 800, the communication unit 802 may be configured to receive, from the target communication apparatus, channel feedback information on the channel from the wireless communication apparatus 800 to the target communication apparatus. After the communication unit 802 receives the channel feedback information and provides the channel feedback information to the channel information determination unit 803, the channel information determination unit 803 may determine the channel characteristic of the channel from the wireless communication apparatus 800 to the target communication apparatus based on the geometry configuration of the antenna array of the wireless communication apparatus 800 itself and the channel feedback information.

In an embodiment, the channel feedback information may include an index number of a codeword in a feedback codebook corresponding to the geometry configuration of the antenna array. The channel information determination unit 803 may be configured to determine the channel characteristic of the channel from the wireless communication apparatus 800 to the target communication apparatus based on the geometry configuration of the antenna array of the wireless communication apparatus 800 itself and the index number of the codeword.

Particularly, the wireless communication apparatus 800 may further include a codebook storage unit. The codebook storage unit may be configured to store multiple feedback codebooks corresponding to multiple geometry configurations of the antenna array. In this case, the channel information determination unit 803 is configured to determine the feedback codebook corresponding to the geometry configuration of the antenna array by querying the codebook storage unit.

In an embodiment, the feedback codebook may include a precoding matrix codebook. In this embodiment, the channel information determination unit 803 may determine a precoding matrix for the target communication apparatus based on the geometry configuration of the antenna array and the index number of the codeword.

As a specific embodiment, in a cellular wireless communications system operating in frequency division duplex (FDD) mode, a base station communicates with a UE. The UE needs to feedback a precoding matrix indicator (PMI) to the base station according to channel condition. It is assumed that M antenna elements of an antenna array of the base station are arranged in one of the configurations as shown in FIGS. 2(*a*) to 2(*d*).

In this embodiment, four codebooks for four antenna array configurations as shown in FIGS. 2(*a*) to 2(*d*) are pre-stored in the base station and the user equipment. The base station (as an example for the wireless communication apparatus 800) notifies the user equipment (as an example for the wireless communication apparatus 700) of the antenna array configuration of the base station through broadcast information. The user equipment is notified of the antenna array configuration of the base station through broadcast information from the base station, and selects a codebook corresponding to the antenna array configuration of the base station for channel feedback. The user equipment performs channel estimation on the downlink channel, and selects a codeword from the codebook corresponding to the antenna array configuration of the base station using downlink channel information. The user equipment transmits an index number of the selected codeword to the base station as PMI. On reception of the PMI, the base station queries the codebook corresponding to its antenna array configuration and extracts a corresponding codeword as the precoding matrix information transmitted by the user equipment.

It is assumed that, $2^n$ codewords are configured for each antenna array configuration to implement the present disclosure. If a codebook including codewords for all of the four antenna array configurations in the conventional channel feedback technology is used, the amount of channel feedback at each time is n+2 bits. However, according to the present disclosure, the amount of channel feedback at each time is n bits. As can be seen, the channel feedback overhead can be significantly reduced with the technology according to the present disclosure.

In the above embodiments, four codebooks are pre-stored for the four antenna array configurations as shown in FIGS. 2(*a*) to 2(*d*). Alternatively, the codebook can be pre-stored according to one or more items of the geometry information. For example, one code codebook may be pre-stored for antenna arrays with single-polarized elements (antenna array configurations as shown in FIGS. 2(*a*) and 2(*c*)), and another codebook may be pre-stored for antenna arrays with orthogonal polarized elements (antenna array configurations as shown in FIGS. 2(*b*) and 2(*d*)).

Referring back to FIG. 6, as described above, the channel characteristic of the channel from the target communication apparatus to the wireless communication apparatus 600, which is estimated by the channel estimation unit 603, may include at least one of an instantaneous channel characteristic and a channel statistical characteristic. The channel estimation unit 603 may estimate the instantaneous channel characteristic and the channel statistical characteristic with various methods known in the art. In a conventional multi-antenna system, the statistical value of the channel characteristic is estimated on a time-averaged basis. As compared with the instantaneous channel characteristic, such channel statistical characteristic is less sensitive to fluctuating factors since it is a long-term characteristic. The inventor has recognized that, in an antenna array, if a relative position relationship between antennas in each of different antenna pairs is identical or similar to each other, a channel correlation between antennas in each of the antenna pairs is identical or similar to each other. The effect of fluctuating factors can also be eliminated or reduced by averaging instantaneous channel correlations between antennas in such antenna pair. Such antenna pair can be identified according to the antenna array configuration (antenna array geometry information) involving geometry distribution of antenna elements in the antenna array. In this way, sufficient estimation accuracy can be achieved without a large time overhead, due to increase of samples.

In an embodiment of the present disclosure, the channel estimation unit 603 may be configured to estimate an instantaneous channel characteristic of the channel from the target communication apparatus to the wireless communication apparatus 600 based on the training sequence signal, and estimate a channel statistical characteristic of the channel from the target communication apparatus to the wireless communication apparatus 600 based on the estimated instantaneous channel characteristic and the geometry configuration of the antenna array of the target communication apparatus.

The channel estimation unit 603 may estimate the channel characteristic of the channel from the target communication apparatus to the wireless communication apparatus 600 based on the training sequence signal using various methods known in the art. The training sequence signal may be downlink reference signal such as CRS or CSI-RS, or uplink reference signal such as DM-RS, or the like, for example.

In an embodiment, the channel estimation unit 603 may determine, based on instantaneous channel estimation values of multiple antenna pairs in the antenna array which reflect correlations between antennas, a channel statistical information estimation value of at least one of the antenna pairs which reflects a correlation between antennas, thereby estimating the channel statistical characteristic of the channel from the target communication apparatus to the wireless communication apparatus 600. The above multiple antenna pairs have the substantially same relative geometry relationship, where the antenna pairs having the substantially same relative geometry relationship may be understood as that, each antenna pair includes a first antenna element and a second antenna element, and there is the substantially same geometry relationship between the first antenna element and the second antenna element included in each of the multiple antenna pairs having the substantially same relative geometry relationship in the antenna array.

Figure 9:
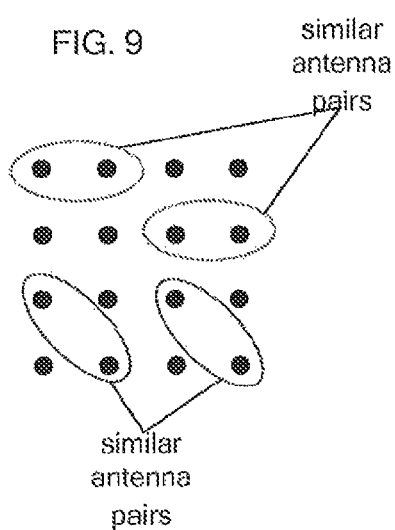
FIG. 9 is a schematic diagram illustrating an example of similar antenna pairs in a single polarization antenna array.

Here, the relative geometry relationship between the first antenna element and the second antenna element may include a spatial position deviation and a polarization direction deviation. FIG. 9 schematically illustrates a simple example of similar antenna pairs. In the example shown in FIG. 9, antenna elements have a same polarization direction. The similar antenna pairs are antenna pairs having the substantially same spatial position. Here, the spatial position may include a distance or a two-dimensional relative coordinate between the first antenna element and the second antenna element. In a case of considering the polarization direction deviation, for example, two antenna elements may be considered to have the same polarization direction when an absolute value of a difference between polarization angles of the first antenna element and the second antenna element is smaller than or equal to a predetermined threshold, which may be, for example 45° in this embodiment.

In an embodiment, the communication unit 601 may receive the training sequence signals from the target communication apparatus at different time points for multiple times. The channel estimation unit 603 may calculate, based on the training sequence signal received each time, instantaneous channel estimation value-based average values for the multiple antenna pairs which have the substantially same geometry relationship, and further perform time averaging on the average values to determine the channel statistical information estimation value for at least one of the multiple antenna pairs. As an example of calculating the instantaneous channel estimation value-based average value, for example but not as a limitation, an average value or a covariance related to antenna coefficients between antennas may be calculated. For example, assuming that instantaneous channel coefficients corresponding to antenna i and antenna j are $h_i$ and $h_j$, an average value based on the instantaneous channel estimation values of the antenna i and the antenna j may be calculated as an average value of $h_i \times h_j^*$, the symbol "*" indicates a conjugation operation. Alternatively, the average value based on the instantaneous channel estimation values of the antenna i and the antenna j may be calculated as $E((h_i - E(h_i))(h_j - E(h_j)^*)$, where E( ) indicates an expectation value.

Further, the method for estimating the channel statistical characteristic based on the antenna array geometry information is applicable not only to the wireless communication apparatuses 600 and 700 which receive the antenna array geometry information of the target communication apparatus, but also to the wireless communication apparatus 800 provided with the antenna array and configured to generate the antenna array geometry information based on the geometry configuration of its antenna array.

Referring back to FIG. 8, the communication unit 802 may be further configured to receive the training sequence signal from the target communication apparatus. For example, in a case that the wireless communication apparatus 800 is implemented as a base station, the training sequence signal may be an uplink reference signal such as SRS (Sounding Reference Signal), for example.

The wireless communication apparatus 800 may also include a channel estimation unit (not shown) configured to estimate an instantaneous channel characteristic of a channel from the target communication apparatus to the wireless communication apparatus 800 based on the training sequence signal, and estimate an channel statistical characteristic of the channel from the target communication apparatus to the wireless communication apparatus 800 based on the estimated instantaneous channel characteristic and the antenna array geometry configuration of the antenna array 800X.

For example, the channel estimation unit of the wireless communication apparatus 800 determines, based on instantaneous channel estimation values of multiple antenna pairs in the antenna array 800X which have the substantially same relative geometry relationship, a channel statistical information estimation value of at least one of the multiple antenna pairs, thereby estimating the channel statistical characteristic of the channel from the target communication apparatus to the wireless communication apparatus 600. The above multiple antenna pairs have the substantially same relative geometry relationship. As described above, the antenna pairs having the substantially same relative geometry relationship may be understood as that, each antenna pair includes a first antenna element and a second antenna element, and there is the substantially same geometry relationship between the first antenna element and the second antenna element included in each of the multiple antenna pairs having the substantially same relative geometry relationship in the antenna array. Similarly, the relative geometry relationship between the first antenna element and the second antenna element may include a spatial position deviation and a polarization direction deviation.

The communication unit 802 may receive the training sequence signal from the target communication apparatus for multiple times at different time points. The channel estimation unit of the wireless communication apparatus 800 may calculate, based on the training sequence signal received each time, instantaneous channel estimation value-based average values for the multiple antenna pairs which have the substantially same geometry relationship, and further perform time averaging on the average values to determine the channel statistical information estimation value for at least one of the multiple antenna pairs.

In addition, the communication unit 802 may be configured to transmit information on the number of antennas in the antenna array 800X to its target communication apparatus. Both the information on the number of antennas and/or the antenna array geometry information belong to antenna configuration information. It should be understood that, the communication unit 802 may also be configured to receive the antenna array configuration information configured by its target communication apparatus from the target communication apparatus. In some examples, for example, each of two parties of the communication may select the codebook according to the antenna configuration information thereof and the antenna configuration information of the counterpart.

As compared to estimating channel statistical characteristic on a time-average basis according to the conventional technology, channel statistical characteristic (the channel statistical information estimation value) can be more rapidly estimated when it is performed based on the antenna array geometry information, thus the time overhead can be reduced significantly. Further, given the same time overhead, the fast estimation based on the antenna array geometry information has a significantly higher accuracy as compared with the conventional technology.

In the following, a method of fast estimating the channel statistical characteristic based on the antenna array geometry information is described in detail with reference to a specific embodiment.

As a specific embodiment, in a cellular wireless communication system, base stations communicate with UEs. A large-scale antenna array is deployed at the base station side. The antenna configuration information of all base stations is recorded in a database of a certain core network apparatus. The core network apparatus notifies a base station of geometry information of an antenna configuration of the base station (as an implementation of generating the antenna array geometry information based on the geometry configuration of the antenna array). Alternatively, a UE transmits a training sequence signal such as an SRS, and the base station estimates channel statistical information of a uplink channel between the base station and the UE using the channel statistical information fast estimation method according to the present disclosure. The estimated channel statistical information can be used for user scheduling, pilot allocation, precoding and the like which utilize the channel statistical information. Alternatively, the base station transmits the acquired antenna array geometry information to the UE via for example a broadcast control channel, and transmits a training sequence signal such as CRS to the UE. Further, the UE estimates channel statistical information of a downlink channel between the UE and the base station using the channel statistical information fast estimation method according to the present disclosure. The estimated channel statistical information can be used for cell handover, precoding and the like which utilize the channel statistical information. For the sake of convenience, fast estimation in the UE is described as an example in the following.

Figure 10:
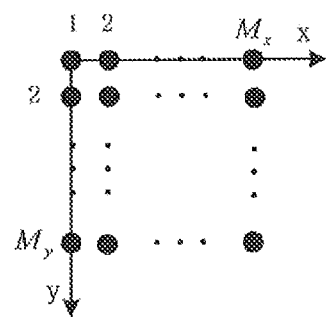
FIG. 10 is a schematic diagram illustrating a planar antenna array according to an embodiment of the present disclosure.
Figure 11:
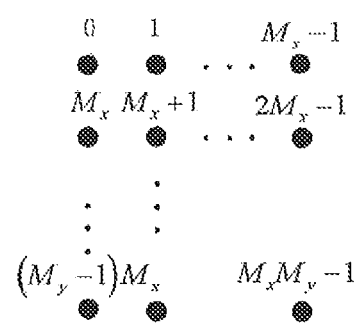
FIG. 11 is a schematic diagram illustrating numbering of antenna elements in the planar array.

Particularly, reference is made to FIGS. 10 and 11. FIG. 10 is a schematic diagram illustrating a planar antenna array according to an embodiment of the disclosure. FIG. 11 is a schematic diagram illustrating numbering of antenna elements in the planar array as shown in FIG. 10. It is assumed that a planar antenna array consisting of $M_y \times M_x$ identically polarized antenna elements as shown in FIG. 10 is mounted at a base station, which communicates with a single-antenna user equipment. As shown in FIG. 11, antenna elements of the antenna array are sequentially numbered as 0, 1, . . . , $M_x M_y - 1$. The statistical parameter to be estimated is correlation matrix R represented by the following equation (1):

$$R = E(h^H h) \quad (1),$$

where the channel vector h is a row vector having a length of $M_x M_y$.

After acquiring the antenna array geometry information of the base station, the UE establishes an antenna pair relative position table which records relative position information of $M_x^2 M_y^2$ antenna pairs. An antenna pair consisting of antennas of which the antenna numbers are m and n respectively with the antenna m functioning as the main antenna is indicated by (m,n). The two dimensional coordinates of the antenna element m is indicated by $(y_m, x_m)$. The relative position $p_{mn}$ corresponding to the antenna pair (m,n) is recorded as $(y_m - y_n, x_m - x_n)$ in the table, i.e., $p_{mn} = (y_m - y_n, x_m - x_n)$ Then, the following statistical pre-processing is performed by the UE.

As shown by equation (2), relative positions of two pairs of antennas are compared to acquire a coefficient a[(m,n), (m̃,ñ)].

$$a[(m,n),(\tilde{m},\tilde{n})] = \begin{cases} 1, & p_{mn} = p_{\tilde{m}\tilde{n}}; \\ 0, & \text{other} \end{cases} \quad (2)$$

Then, a matrix $A_{mn}$ as shown by equation (3) is generated for each antenna pair (m,n).

$$A_{mn}(\tilde{m},\tilde{n}) = a[(m,n),(\tilde{m},\tilde{n})] \quad (3)$$

where the matrix $A_{mn}$ is antenna library for the antenna pair (m,n).

Next, a statistical information fast estimation process is performed by the UE. Specifically, The correlation matrix R is estimated according to the similar antenna library $A_{mn}$ and a current instantaneous estimation value $\hat{h}_t$ of the channel, to acquire an estimation value $\hat{R}_{f,t}$. $\hat{R}_{f,t}$ for the matrix element (m,n) is expressed by equation (4).

$$\hat{R}_{f,t}(m,n) = \frac{\sum_{(i,j)} \{(h^H h) \circ A_{mn}\}_{ij}}{\sum_{(i,j)} \{A_{mn}\}_{ij}} \quad (4)$$

where "∘" is Hadamard product, and $$\sum_{(i,j)} \{X\}_{ij}$$

is a sum of all matrix elements in the matrix X.

Next, the fast estimation result $\hat{R}_{f,t}$ acquired at t-th time is averaged with $\hat{R}_{t-1}$ acquired at (t−1)-th time by the UE, in order to acquire the channel estimation result for this time, as expressed by equation (5).

$$\hat{R}_t = \frac{\hat{R}_{f,t} + (t-1)\hat{R}_{t-1}}{t} \quad (5)$$

When the fast estimation is performed for the first time, it is not necessary for the UE to perform time averaging.

The present disclosure is described by referring to flow-charts and/or block diagrams of the method and the device according to embodiments of the present disclosure in the above. It should be noted that, for the purpose of clarity, indication and description of components and processing irrelevant to the present disclosure and known by those skilled in the art are omitted in the drawings and the description. Each block of the flowchart and/or the block diagram and combinations of blocks in the flowcharts and/or block diagrams can be implemented with computer program instructions. These computer program instructions may be provided to a processor of a general purpose computer, a special purpose computer or other programmable data processing apparatus, thereby producing such a machine that, by executing the instructions by the computer or the other programmable data processing apparatus, an apparatus for achieving functions/operations specified in the flowchart/blocks of block diagrams is generated.

These computer program instructions may also be stored in a computer-readable medium which can be used to instruct a computer or other programmable data processing apparatus to operate in a particular manner, so that the instructions stored in the computer-readable medium generate manufactured articles including instruction means for implementing functions/operations specified in blocks of the flow charts and/or block diagrams.

The computer program instructions may also be loaded in a computer or other programmable data processing apparatus, so that a series of operation steps are executed in the computer or other programmable data processing apparatus so as to produce a process implemented by the computer, thereby instructions executed in the computer or other programmable apparatus provide a process of implementing functions/operations specified in blocks in the flowcharts and/or block diagrams.

Figure 12:
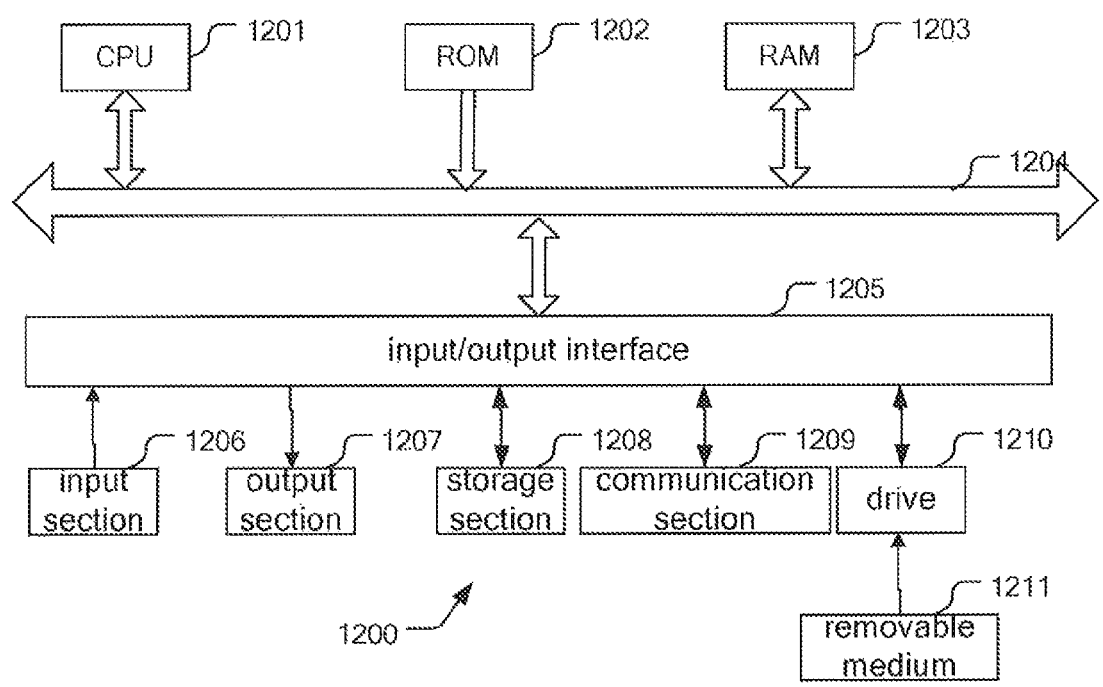
FIG. 12 is a block diagram illustrating an exemplary structure of a computer capable of implementing the present disclosure.

It should be appreciated that, the flowcharts and block diagrams in the drawings illustrate architectures, functions and operations which may be implemented by the system the method and computer program product according to various embodiments of the present disclosure. In this regard, each block in the flowcharts or the block diagrams may represent a module, a program segment or a part of the code, the module, the program segment or the part of the code includes one or more executable instructions for implementing the specified logic functions. It should also be noted that, in some alternative implementations, the functions noted in the blocks may also be implemented in an order different from that illustrated in the drawings. For example, two consecutive blocks may be actually executed substantially in parallel, or they may also be performed in a reverse order, depending on the involved functionality. It should also be noted that, each block in the block diagrams and/or flowchart block as well as combinations of the blocks in the block diagrams and/or the flowcharts, may be implemented by a dedicated system based on hardware for executing specified functions or operations, or may be implemented by combinations of a dedicated hardware and computer instructions FIG. 12 is a block diagram illustrating an exemplary structure of a computer capable of implementing the present disclosure. In FIG. 12, a central processing unit (CPU) 1201 performs various processing according to the program stored in a read only memory (ROM) 1202 or the program loaded from the storage section 1208 to a random access memory (RAM) 1203. In the RAM 1203, the data required by CPU 1201 to execute various processes is also stored as necessary.

CPU 1201, ROM 1202 and RAM 1203 are connected to each other via a bus 1204. Input/output interface 1205 is also connected to the bus 1204.

The following components are connected to the input/output interface 1205: an input section 1206, including a keyboard, a mouse, etc.; an output section 1207, including a display, such as a cathode ray tube (CRT), a liquid crystal display (LCD), etc., and a speaker, etc.; a storage section 1208 including a hard disk, etc.; and a communication section 1209, including a network interface card such as a LAN card, a modem, etc. The communication section 1209 performs a communication process via a network such as Internet.

A drive 1210 may also be connected to the input/output interface 1205 as needed. A removable medium 1211 such as a disk, an optical disk, a magneto-optical disk, or a semiconductor memory, is mounted on the drive 1210 as needed, such that a computer program read out therefrom is installed in the storage section 1208 as needed.

In the case of implementing the above-described steps and processes by software, the program constituting the software is installed from the network such as Internet or a storage medium such as the removable medium 1211.

It should be appreciated by those skilled in the art that, such storage medium is not limited to the removable medium 1211 shown in FIG. 12 in which the program is stored and which is distributed separately from the apparatus so as to provide the program to the user. The examples of the removable medium 1211 include a floppy disk, an optical disk (including compact disc read-only memory (CD-ROM) and a digital versatile disk (DVD)), a magneto-optical disk (including a mini disc (MD)) and a semiconductor memory. Alternatively, the storage medium may be a ROM 1202, a hard disk included in the storage section 1208 and so on, in which the program is stored and which is distributed to users together with the apparatus containing it.

For example, the base station according to the present disclosure may be implemented as an evolved node B (eNB) of any type, such as a macro eNB and a small eNB. The small eNB may be an eNB which covers a cell smaller than a macro cell, such as a pico eNB, a micro eNB and a home (femto) eNB. Alternatively, the base station may be implemented as a base station of any other type, such as a Node B and a base transceiver station (BTS). The base station may include: a main body (also referred to as a base station device) configured to control the wireless communication, and one or more remote radio header (RRH) provided at a different site from the main body. With the development of C-RAN (Centralized, Cooperative, Cloud RAN), the above main body controlling the wireless communication may also be a base-band cloud processing device such as a server. Further, various types of terminals described hereinafter may serve as a base station by performing the function of the base station temporarily or semi-permanently.

For example, the user equipment according to the present disclosure may be implemented as a mobile terminal (such as an smart phone, a panel personal computer (PC), a notebook PC, an intelligent wearable equipment, a portable game terminal, a portable/softdog mobile router and a digital camera device) or an automobile-mounted terminal (such as a car navigation device). The above user equipment may also be implemented as a terminal for performing machine to machine (M2M) communication (which is also referred to as a machine-type communication (MTC) terminal). Further, the above user equipment may be a wireless communication module mounted on each of the above terminals (such as the integrated circuit module including a single chip).

In the following, application examples of the base station and the user equipment are described in conjunction with FIGS. 13 to 15.

Figure 13:
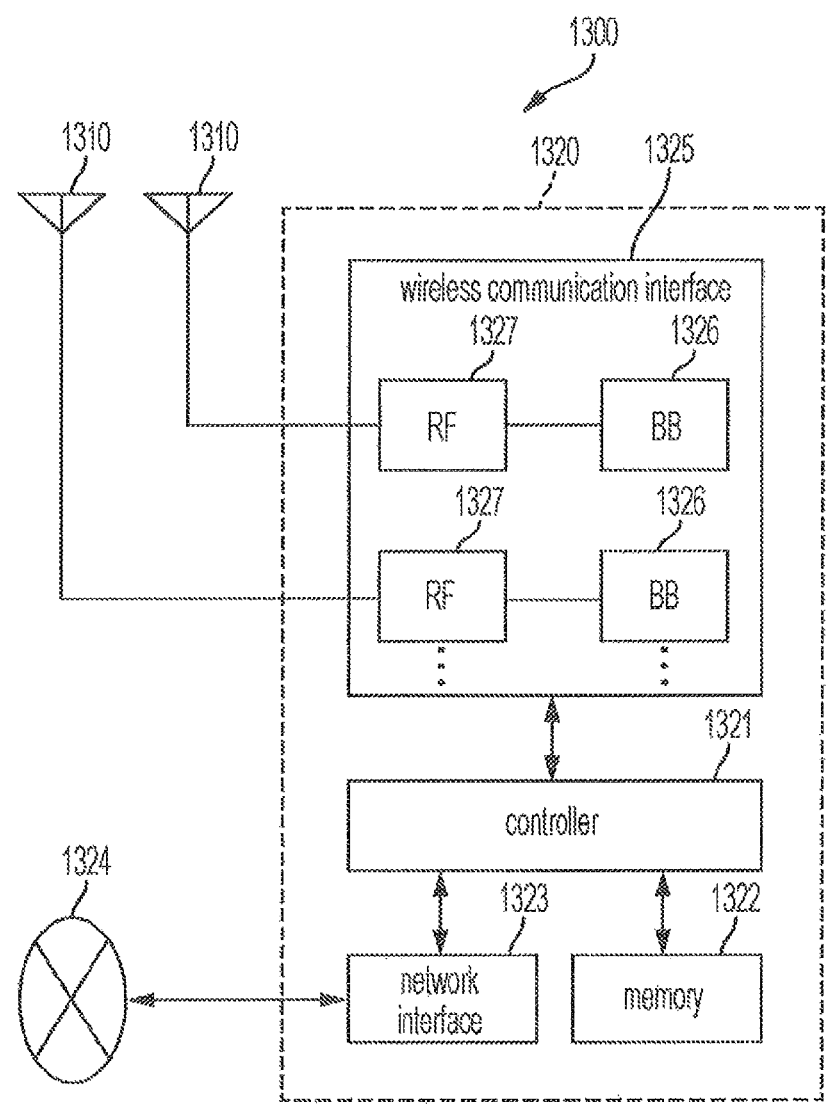
FIG. 13 is a block diagram illustrating a first example of a schematic configuration of an eNB to which the technology of the present disclosure is applicable.

FIG. 13 is a block diagram illustrating a first example of a schematic configuration of an eNB to which the technology of the present disclosure is applicable. The eNB 1300 includes one or more antennas 1310 and a base station device 1320. The base station device 1320 and each of the antennas 1310 may be connected with each other via RF cable.

Each of the antennas 1310 includes one or more antenna element (such as the multiple antenna elements included in the multiple-input multiple-output (MIMO) antenna), and is used for transmitting and receiving the wireless signal by the base station device 1320. As shown in FIG. 13, the eNB 1300 may include multiple antennas 1310. For example, the multiple antennas 1310 may be compatible with the multiple frequency bands used by the eNB 1300. Although an example of the eNB 1300 including multiple antennas 1310 is shown in FIG. 13, the eNB 1300 may include a single antenna 1310.

The base station device 1320 includes a controller 1321, a memory 1322, a network interface 1323 and a wireless communication interface 1325.

The controller 1321 may be for example a CPU or DSP, and perform various functions of higher levels of the base station device 1320. For example, the controller 1321 generates a data packet based on the data in the signal processed by the wireless communication interface 1325, and transfers the generated packet via the network interface 1323. The controller 1321 may bundle data from multiple baseband processors to generate the bundled data, and transfer the generated bundled data. The controller 1321 may have the logical function to perform the control such as wireless resource control, wireless carrying control, mobility management, admission control and scheduling. The control may be performed in conjunction with the neighboring eNB or core network node. The memory 1322 includes RAM and ROM, and stores the program to be performed by the controller 1321 and various types of control data (such as a terminal list, transmission power data and scheduling data).

The network interface 1323 is a communication interface for connecting the base station device 1320 to the core network 1324. The controller 1321 may communicate with the core network node or another eNB via the network interface 1323. In this case, the eNB 1300 and the core network node or other eNB may be connected via a logic interface (such as S1 interface and X2 interface). The network interface 1323 may also be a wired communication interface or a wireless communication interface for wireless backhaul routing. If the network interface 1323 is a wireless communication interface, the network interface 1323 may use a higher frequency band for wireless communication as compared with that used by the wireless communication interface 1325.

The wireless communication interface 1325 supports any cellular communication scheme (such as the long term evolution (LTE) and the LTE-advanced), and provides a wireless connection to a terminal located in the cell of the eNB 1300 via the antenna 1310. The wireless communication interface 1325 may generally include for example a baseband (BB) processor 1326 and a RF circuit 1327. The BB processor 1326 may perform for example coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 1321, the BB processor 1326 may have some or all of the above logical functions. The BB processor 1326 may be a memory storing the communication control program, or a module including a processor and related circuit configured to perform the program. The updating program may change the function of the BB processor 1326. The module may be a card or blade inserted into the slot of the base station device 1320. Alternatively, the module may be a chip mounted on the card or the blade. The RF circuit 1327 may include for example a mixer, a filter and an amplifier, and transmit and receive the wireless signal via the antenna 1310.

As shown in FIG. 13, the wireless communication interface 1325 may include multiple BB processors 1326. For example, the multiple BB processors 1326 may be compatible with the multiple frequency bands used by the eNB 1300. As shown in FIG. 13, the wireless communication interface 1325 may include multiple RF circuits 1327. For example, the multiple RF circuits 1327 may be compatible with multiple antenna elements. Although an example in which the wireless communication interface 1325 including multiple BB processors 1326 and multiple RF circuits 1327 is shown in FIG. 13, the wireless communication interface 1325 may include a single BB processor 1326 and a single RF circuit 1327.

Figure 14:
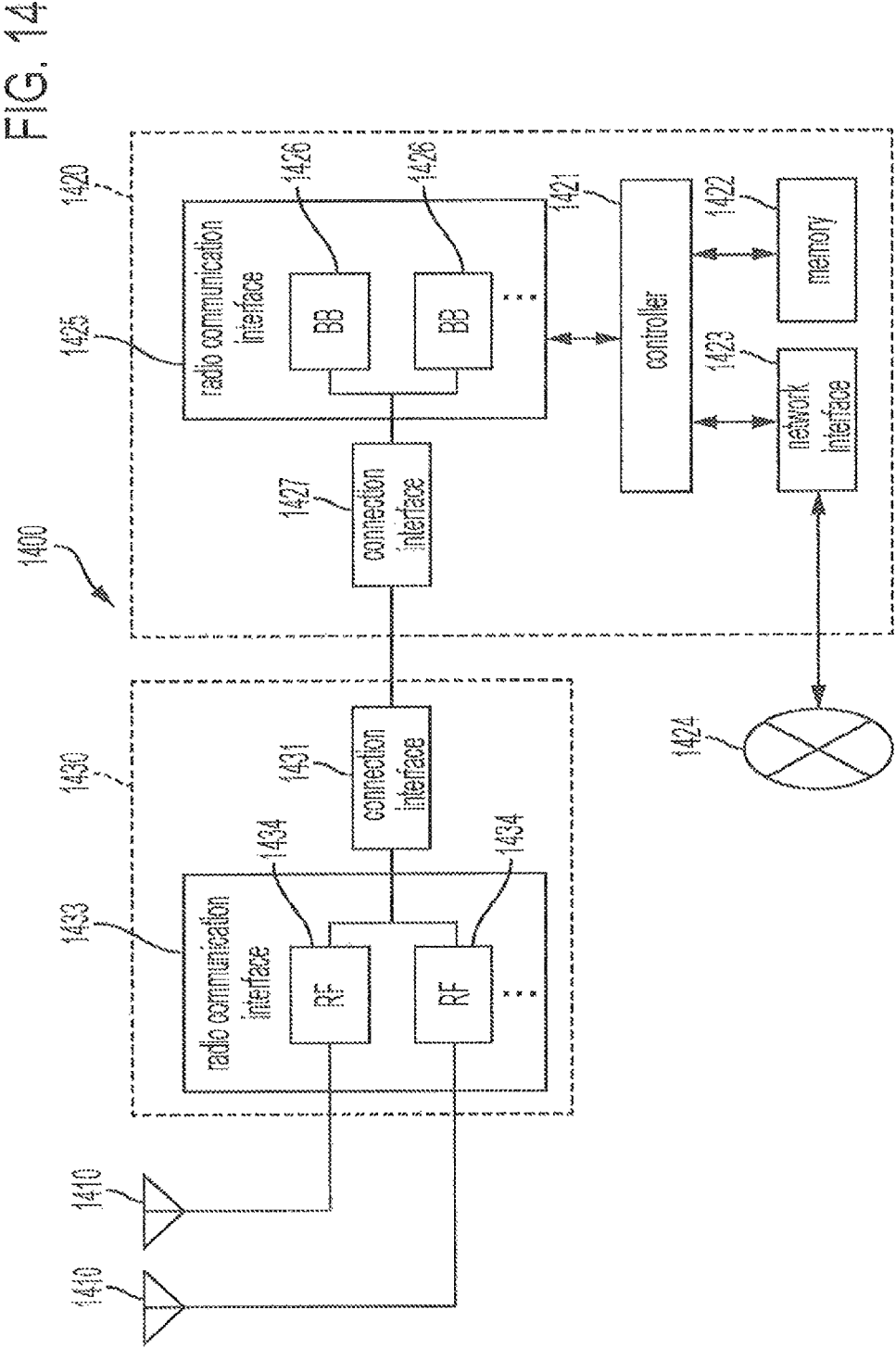
FIG. 14 is a block diagram illustrating a second example of a schematic configuration of an eNB to which the technology of the present disclosure is applicable.

FIG. 14 is a block diagram illustrating a second example of a schematic configuration of an eNB to which the technology of the present disclosure is applicable. The eNB 1400 includes one or more antennas 1410, a base station device 1420 and a RRH 1430. The RRH 1430 and each of the antennas 1410 may be connected with each other via RF cable. The base station device 1420 and the RRH 1430 may be connected via a high-speed line, such as an optical fiber cable.

Each of the antennas 1410 includes one or more antenna element (such as the multiple antenna elements included in the MIMO antenna), and is used for transmitting and receiving the wireless signal by the RRH 1430. As shown in FIG. 14, the eNB 1400 may include multiple antennas 1410. For example, the multiple antennas 1410 may be compatible with the multiple frequency bands used by the eNB 1400. Although the eNB 1400 including multiple antennas 1410 is shown in FIG. 14, the eNB 1400 may include a single antenna 1410.

The base station device 1420 includes a controller 1421, a memory 1422, a network interface 1423, a wireless communication interface 1425 and a connection interface 1427. The controller 1421, the memory 1422 and the network interface 1423 are respectively the same as the controller 1321, the memory 1322 and the network interface 1323 described referring to FIG. 13. The network interface 1423 is configured to connect the base station device 1420 to the core network 1424.

The wireless communication interface 1425 supports any cellular communication scheme (such as the LTE and the LTE-advanced), and provides a wireless connection to a terminal located in a sector corresponding to the RRH 1430 via the RRH 1430 and the antenna 1410. The wireless communication interface 1425 may generally include for example a baseband (BB) processor 1426. Except for the BB processor 1426 being connected to the RF circuit 1434 of the RRH 1430 via the connection interface 1427, the BB processor 1426 is the same as the BB processor 1326 described referring to FIG. 13. As shown in FIG. 14, the wireless communication interface 1425 may include multiple BB processors 1426. For example, the multiple BB processors 1426 may be compatible with the multiple frequency bands used by the eNB 1400. Although an example in which the wireless communication interface 1425 including multiple BB processors 1426 is shown in FIG. 14, the wireless communication interface 1425 may include a single BB processor 1426.

The connection interface 1427 is an interface for connecting the base station device 1420 (the wireless communication interface 1425) to the RRH 1430. The connection interface 1427 may also be a communication module for communication in the above-mentioned high-speed line connecting the base station device 1420 (the wireless communication interface 1425) to the RRH 1430.

The RRH 1430 includes a connection interface 1431 and a radio communication interface 1433.

The connection interface 1431 is an interface for connecting the RRH 1430 (the radio communication interface 1433) to the base station device 1420. The connection interface 1431 may also be a communication module for communication in the above-mentioned high-speed line.

The radio communication interface 1433 transmits and receives the wireless signal via the antenna 1410. The radio communication interface 1433 may generally include for example a RF circuit 1434. The RF circuit 1434 may include for example a mixer, a filter and an amplifier, and transmit and receive the wireless signal via the antenna 1410. As shown in FIG. 14, the radio communication interface 1433 may include multiple RF circuits 1434. For example, the multiple RF circuits 1434 may support multiple antenna elements. Although an example in which the radio communication interface 1433 including multiple RF circuits 1434 is shown in FIG. 14, the radio communication interface 1433 may include a single RF circuit 1434.

In the eNB 1300 and eNB 1400 shown in FIG. 13 and FIG. 14, the communication units 102, 401, 601, 701 and 802 described referring to FIGS. 1, 4, 6, 7 and 8 may be implemented with the wireless communication interface 1325 and the radio communication interface 1425 and/or the radio communication interface 1433. At least some of the functions may be implemented by the controller 1321 and the controller 1421. For example, the wireless communication apparatus 100 implemented in the example shown in FIG. 13 may execute the function of the antenna array geometry information generation unit 101 by using the controller 1321.

Figure 15:
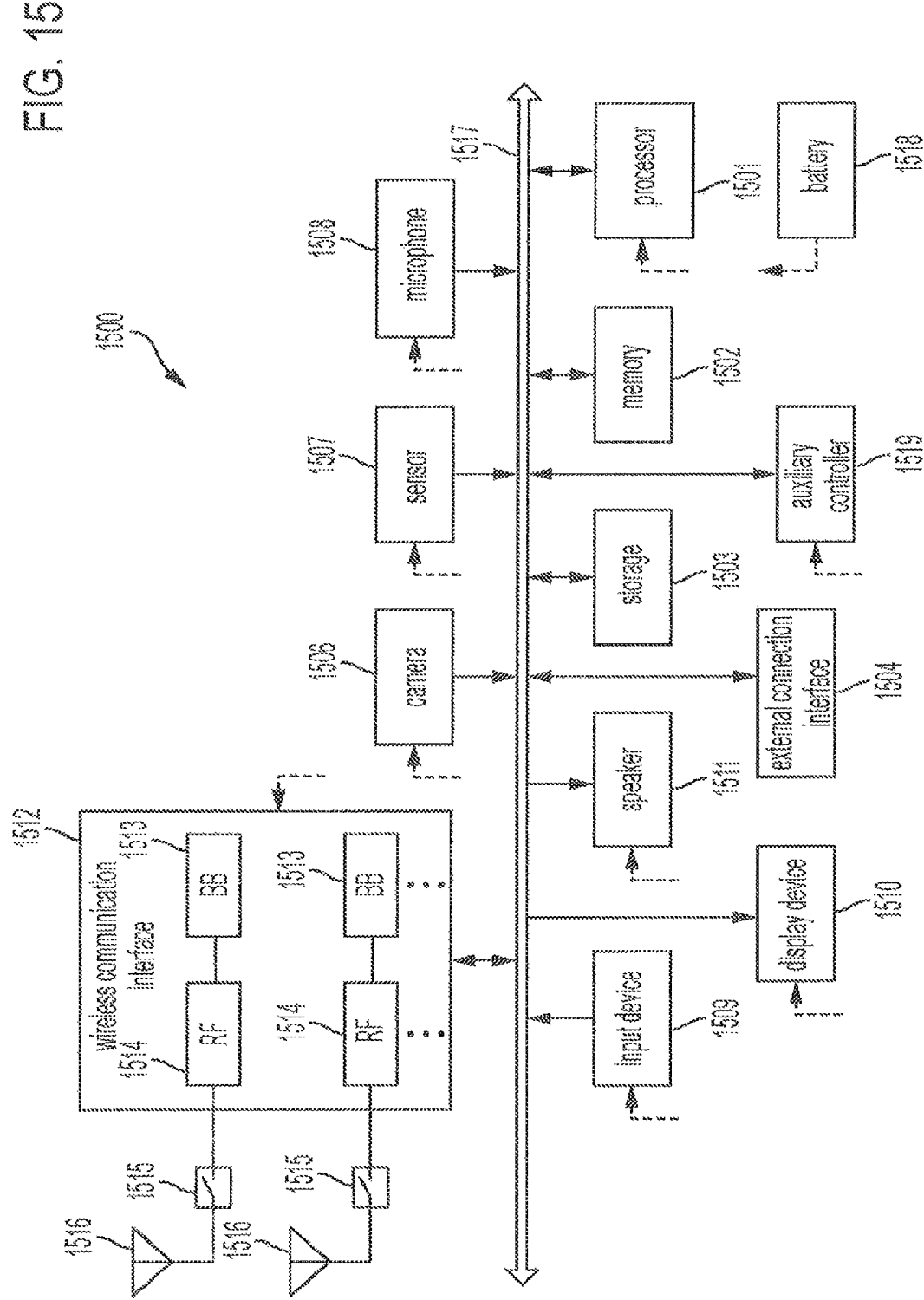
FIG. 15 is a block diagram illustrating a schematic configuration of a smartphone to which the technology of the present disclosure is applicable.

FIG. 15 is a block diagram illustrating a schematic configuration of a smartphone 1500 to which the technology of the present disclosure is applicable. The smartphone 1500 includes a processor 1501, a memory 1502, a storage 1503, an external connection interface 1504, a camera 1506, a sensor 1507, a microphone 1508, an input device 1509, a display device 1510, a speaker 1511, a wireless communication interface 1512, one or more antenna switches 1515, one or more antennas 1516, a bus 1517, a battery 1518, and an auxiliary controller 1519.

The processor 1501 may be, for example, CPU or System on Chip (SoC), and controls functions of an application layer and another layer of the smartphone 1500. The memory 1502 includes RAM and ROM, and stores a program that is executed by the processor 1501, and data. The storage 1503 may include a storage medium such as a semiconductor memory and a hard disk. The external connection interface 1504 is an interface for connecting an external device (such as a memory card and a universal serial bus (USB) device) to the smartphone 1500.

The camera 1506 includes an image sensor (such as charge coupled device (CCD) and complementary metal oxide semiconductor (CMOS)), and generates a captured image. The sensor 1507 may include a set of sensors such as a measurement sensor, a gyro sensor, a geomagnetic sensor, and an acceleration sensor. The microphone 1508 converts sounds that are input to the smartphone 1500 to audio signals. The input device 1509 includes, for example, a touch sensor configured to detect touch on a screen of the display device 1510, a keypad, a keyboard, a button, or a switch, and receives operation or information input from a user. The display device 1510 includes a screen such as a liquid crystal display (LCD) and an organic light-emitting diode (OLED) display, and displays an output image of the smartphone 1500. The speaker 1511 converts audio signals output from the smartphone 1500 to sounds.

The wireless communication interface 1512 supports any cellular communication scheme (such as LET and LTE-Advanced), and performs wireless communication. The wireless communication interface 1512 may typically include, for example, a BB processor 1513 and an RF circuit 1514. The BB processor 1513 may perform, for example, encoding/decoding, modulating/demodulating, and multiplexing/demultiplexing, and performs various types of signal processes for wireless communication. Meanwhile, the RF circuit 1514 may include, for example, a mixer, a filter, and an amplifier, and transmits and receives wireless signals via the antenna 1516. The wireless communication interface 1512 may be one chip module having the BB processor 1513 and the RF circuit 1514 integrated therein. The wireless communication interface 1512 may include the multiple BB processors 1513 and the multiple RF circuits 1514, as illustrated in FIG. 15. Although FIG. 15 illustrates the example in which the wireless communication interface 1512 includes the multiple BB processors 1513 and the multiple RF circuits 1514, the wireless communication interface 1512 may include a single BB processor 1513 or a single RF circuit 1514.

Furthermore, in addition to a cellular communication scheme, the wireless communication interface 1512 may support another type of wireless communication scheme such as a short-range wireless communication scheme, a near field communication scheme, and a wireless local area network (LAN) scheme. In that case, the wireless communication interface 1512 may include the BB processor 1513 and the RF circuit 1514 for each wireless communication scheme.

Each of the antenna switches 1515 switches connection destinations for the antennas 1516 among multiple circuits (such as circuits for different wireless communication schemes) included in the wireless communication interface 1512.

Each of the antennas 1516 includes a single or multiple antenna elements (such as multiple antenna elements included in an MIMO antenna), and is used for the wireless communication interface 1512 to transmit and receive wireless signals. The smartphone 1500 may include the multiple antennas 1516, as illustrated in FIG. 15. Although FIG. 15 illustrates the example in which the smartphone 1500 includes the multiple antennas 1516, the smartphone 1500 may include a single antenna 1516.

Furthermore, the smartphone 1500 may include the antenna 1516 with respect to each wireless communication scheme. In that case, the antenna switches 1515 may be omitted in the configuration of the smartphone 1500.

The bus 1517 connects the processor 1501, the memory 1502, the storage 1503, the external connection interface 1504, the camera 1506, the sensor 1507, the microphone 1508, the input device 1509, the display device 1510, the speaker 1511, the wireless communication interface 1512, and the auxiliary controller 1519 to each other. The battery 1518 supplies power to respective blocks of the smartphone 1500 illustrated in FIG. 15 via feeders which are partially shown with dashed lines in the figure. The auxiliary controller 1519 performs the minimum function necessary for the smartphone 1500, for example, in a sleep mode.

In the smartphone 1500 illustrated in FIG. 15, the communication apparatus 401 described by using FIG. 4 may be implemented with the wireless communication interface 1512. At least a part of the functions may also be implemented by the processor 1501 or the auxiliary controller 1519.

It should be understood that, the terminology used herein is only for purpose of describing particular embodiments but not intended to limit the present disclosure. As used herein, "a" and "the" in a singular form are intended to include the plural forms unless the context clearly indicates otherwise. Also, "include" used in this specification specifies the presence of the stated features, entireties, steps, operations, elements, and/or components, but do not preclude the presence or addition of one or more features, entireties, steps, operations, elements and/or components, and/or a combination thereof.

The present disclosure is described by referring to particular embodiments in the foregoing specification. However, those skilled in the art understand that various modifications and changes can be made without departing from the scope of the present disclosure as defined in the claims.

The technology according to the present disclosure may also be implemented with the following embodiments.

1. A wireless communication apparatus which participates in wireless communication involving an antenna array, comprising:

a communication unit configured to receive, from a target communication apparatus for the wireless communication apparatus, a signal including antenna array geometry information of the target communication apparatus; and an antenna array geometry information parsing unit configured to determine geometry configuration of the antenna array of the target communication apparatus based on the signal, wherein the antenna array geometry information indicates at least one of geometry arrangement of antenna elements in the antenna array, spacing between the antenna elements, and antenna polarization direction.

2. The wireless communication apparatus according to embodiment 1, wherein the communication unit is further configured to receive a training sequence signal from the target communication apparatus, and the wireless communication apparatus further comprises:

a channel estimation unit configured to estimate channel characteristic of a channel from the target communication apparatus to the wireless communication apparatus based on the training sequence signal.

3. The wireless communication apparatus according to embodiment 2, further comprising: a channel feedback information determination unit configured to determine, based on the geometry configuration of the antenna array and channel estimation result from the channel estimation unit, channel feedback information indicating the channel characteristic of the channel from the target communication apparatus to the wireless communication apparatus, wherein the communication unit is further configured to transmit the channel feedback information to the target communication apparatus.

4. The wireless communication apparatus according to embodiment 3, wherein the channel feedback information determination unit determines a feedback codebook corresponding to the geometry configuration of the antenna array based on the geometry configuration of the antenna array, and further determines a codeword which matches the channel estimation result in the feedback codebook, and includes an index number of the codeword in the channel feedback information.

5. The wireless communication apparatus according to embodiment 4, further comprising: a codebook storage unit configured to store a plurality of feedback codebooks corresponding to a plurality of geometry configurations of the antenna array, wherein the channel feedback information determination unit determines the feedback codebook corresponding to the geometry configuration of the antenna array by querying the codebook storage unit.

6. The wireless communication apparatus according to embodiment 4 or 5, wherein the feedback codebook includes a precoding matrix codebook.

7. The wireless communication apparatus according to any one of embodiments 3 to 6, wherein the channel characteristic of the channel from the target communication apparatus to the wireless communication apparatus which is estimated by the channel estimation unit includes at least one of instantaneous channel characteristic and channel statistical characteristic, wherein the channel feedback information determination unit determines the corresponding channel feedback information based on the geometry configuration of the antenna array.

8. The wireless communication apparatus according to any one of embodiments 2 to 6, wherein the channel estimation unit estimates instantaneous channel characteristic of the channel from the target communication apparatus to the wireless communication apparatus based on the training sequence signal, and estimates channel statistical characteristic of the channel from the target communication apparatus to the wireless communication apparatus based on the instantaneous channel characteristic and the geometry configuration of the antenna array of the target communication apparatus.

9. The wireless communication apparatus according to embodiment 8, wherein the channel estimation unit determines, based on instantaneous channel estimation values for a plurality of antenna pairs which have the same relative geometry relationship in the antenna array, channel statistical information estimation value for at least one of the plurality of antenna pairs, in order to estimate the channel statistical characteristic of the channel from the target communication apparatus to the wireless communication apparatus, wherein each antenna pair includes a first antenna element and a second antenna element, and there is the same geometry relationship between the first antenna element and the second antenna element included in each of the plurality of antenna pairs having the same relative geometry relationship in the antenna array.

10. The wireless communication apparatus according to embodiment 9, wherein the relative geometry relationship between the first antenna element and the second antenna element includes spatial position deviation and polarization direction deviation.

11. The wireless communication apparatus according to embodiment 9, wherein the communication unit receives training sequence signals from the target communication apparatus at different time points for multiple times, and the channel estimation unit calculates, based on the training sequence signal received each time, instantaneous channel estimation value-based average values for the plurality of antenna pairs, and further performs time averaging on the average values to determine the channel statistical information estimation value for at least one of the plurality of antenna pairs.

12. The wireless communication apparatus according to any one of embodiments 1 to 11, wherein the communication unit is further configured to transmit configuration information of the antenna array of the wireless communication apparatus to the target communication apparatus, wherein the configuration information of the antenna array includes the number of antenna elements and/or the antenna array geometry information.

13. A wireless communication apparatus which is provided with an antenna array, comprising:

an antenna array geometry information generation unit configured to generate antenna array geometry information based on geometry configuration of the antenna array of the wireless communication apparatus, wherein the antenna array geometry information indicates at least one of geometry arrangement of antenna elements in the antenna array, spacing between the antenna elements and antenna polarization direction; and a communication unit configured to transmit a signal including the antenna array geometry information to a target communication apparatus for the wireless communication apparatus.

14. The wireless communication apparatus according to embodiment 13, wherein the communication unit is further configured to receive, from the target communication apparatus, channel feedback information regarding a channel from the wireless communication apparatus to the target communication apparatus, and the wireless communication apparatus further comprises:

a channel information determination unit configured to determine channel characteristic of the channel from the wireless communication apparatus to the target communication apparatus based on the geometry configuration of the antenna array and the channel feedback information.

15. The wireless communication apparatus according to embodiment 14, wherein the channel feedback information comprises an index number of a codeword in a feedback codebook corresponding to the geometry configuration of the antenna array, wherein the channel information determination unit determines the channel characteristic of the channel from the wireless communication apparatus to the target communication apparatus based on the geometry configuration of the antenna array and the index number of the codeword.

16. The wireless communication apparatus according to embodiment 15, further comprising: a codebook storage unit configured to store a plurality of feedback codebooks corresponding to a plurality of geometry configurations of the antenna array, wherein the channel information determination unit determines the feedback codebook corresponding to the geometry configuration of the antenna array by querying the codebook storage unit.

17. The wireless communication apparatus according to embodiment 15 or 16, wherein the feedback codebook includes a precoding matrix codebook, wherein the channel information determination unit determines a precoding matrix for the target communication apparatus based on the geometry configuration of the antenna array and the index number of the codeword.

18. The wireless communication apparatus according to embodiment 13, wherein the communication unit is further configured to receive a training sequence signal from the target communication apparatus, and wherein the wireless communication apparatus further comprises a channel estimating unit configured to estimate instantaneous channel characteristic of a channel from the target communication apparatus to the wireless communication apparatus based on the training sequence signal, and to estimate, based on the instantaneous channel characteristic and the geometry configuration of the antenna array, a channel statistical characteristic of the channel from the target communication apparatus to the wireless communication apparatus.

19. The wireless communication apparatus according to embodiment 18, wherein the channel estimation unit determines, based on instantaneous channel estimation values for a plurality of antenna pairs having the substantially same relative geometry relationship in the antenna array, channel statistical information estimation value for at least one of the plurality of antenna pairs, in order to estimate the channel statistical characteristic of the channel from the target communication apparatus to the wireless communication apparatus, wherein each antenna pair includes a first antenna element and a second antenna element, and there is the substantially same geometry relationship between the first antenna element and the second antenna element included in each of the plurality of antenna pairs having the substantially same relative geometry relationship in the antenna array.

20. The wireless communication apparatus according to embodiment 19, wherein the relative geometry relationship between the first antenna element and the second antenna element includes spatial position deviation and polarization direction deviation.

21. The wireless communication apparatus according to embodiment 19, wherein the communication unit receives training sequence signals from the target communication apparatus at different time points for multiple times, and wherein the channel estimation unit calculates, based on the training sequence signal received each time, instantaneous channel estimation value-based average values for the plurality of antenna pairs, and further performs time averaging on the average values to determine the channel statistical information estimation value for the at least one of the plurality of antenna pairs.

22. The wireless communication apparatus according to any one of embodiments 14 to 21, wherein the communication unit is further configured to receive the configuration information of the antenna array of the target communication apparatus from the target communication apparatus, wherein the configuration information of the antenna array of the target communication apparatus includes the number of the antennas and/or the antenna array geometry information.

23. A wireless communication method applied in wireless communication involving an antenna array, the method comprising:

receiving, from a target communication apparatus, a signal including antenna array geometry information of the target communication apparatus; and determining geometry configuration of the antenna array of the target communication apparatus based on the signal, wherein the antenna array geometry information indicates at least one of geometry arrangement of antenna elements in the antenna array, spacing between the antenna elements and antenna polarizing direction.

24. A wireless communication method employed in a wireless communication apparatus provided with an antenna array, the method comprising:

generating antenna array geometry information based on geometry configuration of the antenna array of the wireless communication apparatus, wherein the antenna array geometry information indicates at least one of geometry arrangement of antenna elements in the antenna array, spacing between the antenna elements and antenna polarizing direction; and transmitting a signal including the antenna array geometry information to a target communication apparatus for the wireless communication apparatus.

25. A wireless communication apparatus which participates in wireless communication involving an antenna array, comprising:

processing circuitry (comprising one or more processors) configured to receive, from a target communication apparatus for the wireless communication apparatus, a signal including antenna array geometry information of the target communication apparatus, and determine geometry configuration of the antenna array of the target communication apparatus based on the signal, wherein the antenna array geometry information indicates at least one of geometry arrangement of antenna elements in the antenna array, spacing between the antenna elements, and antenna polarization direction.

26. A wireless communication apparatus provided with an antenna array, comprising:

processing circuitry (comprising one or more processors) configured to generate antenna array geometry information based on geometry configuration of the antenna array of the wireless communication apparatus, and control to transmit a signal including the antenna array geometry information to a target communication apparatus for the wireless communication apparatus, wherein the antenna array geometry information indicates at least one of geometry arrangement of antenna elements in the antenna array, spacing between the antenna elements and antenna polarization direction.

The invention claimed is:

1. An electronic device in a wireless communication system involving an antenna array, the electronic device comprising:

circuitry configured to:
receive, from a base station having multiple antennas, a downlink reference signal and an indicating signal that indicates geometry information of the multiple antennas of the base station;
generate, based on the downlink reference signal, channel state information for feedback to the base station,
wherein the channel state information comprises a Precoding Matrix Indicator (PMI), the PMI indicating a codebook selected from a plurality of codebooks based on the indicating signal, and
wherein the geometry information in the indicating signal indicates at least one of a positional relationship among the multiple antennas of the base station or antenna polarization direction information of the multiple antennas of the base station; and
transmit the channel state information for feedback to the base station.

2. The electronic device according to claim 1, wherein the positional relationship among the multiple antennas of the base station comprises a positional relationship among the multiple antennas of the base station in at least one of a first dimension or a second dimension.

3. The electronic device according to claim 1, wherein the geometry information in the indicating signal indicates each of a positional relationship among the multiple antennas of the base station or antenna polarization direction information of the multiple antennas of the base station.

4. The electronic device according to claim 1, wherein the downlink reference signal is a Channel State Information (CSI) reference signal.

5. The electronic device according to claim 1, wherein each codebook of the multiple codebooks corresponds to a unique antenna array configuration of the multiple antennas of the base station.

6. The electronic device according to claim 1, wherein each codebook of the multiple codebooks corresponds to a single polarized antenna array configuration or an orthogonal polarized array configuration of the multiple antennas of the base station.

7. A method performed by circuitry of an electronic device in a wireless communication system, the method comprising:

receiving, from a base station having multiple antennas, a downlink reference signal and an indicating signal that indicates geometry information of the multiple antennas of the base station;
generating, based on the downlink reference signal, channel state information for feedback to the base station,
wherein the channel state information comprises a Precoding Matrix Indicator (PMI), the PMI indicating a codebook selected from a plurality of codebooks based on the indicating signal, and
wherein the geometry information in the indicating signal indicates at least one of a positional relationship among the multiple antennas of the base station or antenna polarization direction information of the multiple antennas of the base station; and
transmitting the channel state information for feedback to the base station.

8. The method according to claim 7, wherein the positional relationship among the multiple antennas of the base station comprises a positional relationship among the multiple antennas of the base station in at least one of a first dimension or a second dimension.

9. The method according to claim 7, wherein the geometry information in the indicating signal indicates each of a positional relationship among the multiple antennas of the base station or antenna polarization direction information of the multiple antennas of the base station.

10. The method according to claim 7, wherein the downlink reference signal is a Channel State Information (CSI) reference signal.

11. The method according to claim 7, wherein each codebook of the multiple codebooks corresponds to a unique antenna array configuration of the multiple antennas of the base station.

12. The method according to claim 7, wherein each codebook of the multiple codebooks corresponds to a single polarized antenna array configuration or an orthogonal polarized array configuration of the multiple antennas of the base station.

13. A method performed by circuitry of a base station having multiple antennas in a wireless communication system, the method comprising:

transmitting, to a user device (UE), a downlink reference signal and an indicating signal that indicates geometry information of the multiple antennas of the base station; and
based on the downlink reference signal, receiving channel state information from the UE,
wherein the channel state information comprises a Precoding Matrix Indicator (PMI), the PMI indicating a codebook selected by the UE from a plurality of codebooks based on the indicating signal, and
wherein the geometry information in the indicating signal indicates at least one of a positional relationship among the multiple antennas of the base station or antenna polarization direction information of the multiple antennas of the base station.

14. The method according to claim 13, wherein the positional relationship among the multiple antennas of the base station comprises a positional relationship among the multiple antennas of the base station in at least one of a first dimension or a second dimension.

15. The method according to claim 13, wherein the geometry information in the indicating signal indicates each of a positional relationship among the multiple antennas of the base station or antenna polarization direction information of the multiple antennas of the base station.

16. The method according to claim 13, wherein the downlink reference signal is a Channel State Information (CSI) reference signal.

17. The method according to claim 13, wherein each codebook of the multiple codebooks corresponds to a unique antenna array configuration of the multiple antennas of the base station.

18. The method according to claim 13, wherein each codebook of the multiple codebooks corresponds to a single polarized antenna array configuration or an orthogonal polarized array configuration of the multiple antennas of the base station.

* * * * *